United States Patent
Yoo et al.

(10) Patent No.: US 10,762,897 B2
(45) Date of Patent: Sep. 1, 2020

(54) METHOD AND DISPLAY DEVICE FOR RECOGNIZING VOICE

(71) Applicant: SAMSUNG ELECTRONICS CO., LTD., Suwon-si (KR)

(72) Inventors: Jong-uk Yoo, Suwon-si (KR); Myung-suk Song, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 15/624,038

(22) Filed: Jun. 15, 2017

(65) Prior Publication Data
US 2018/0047390 A1 Feb. 15, 2018

(30) Foreign Application Priority Data

Aug. 12, 2016 (KR) .......................... 10-2016-0103151

(51) Int. Cl.
*G10L 15/20* (2006.01)
*G06F 3/16* (2006.01)
(Continued)

(52) U.S. Cl.
CPC .............. *G10L 15/20* (2013.01); *G06F 3/167* (2013.01); *G10L 15/02* (2013.01); *G10L 15/22* (2013.01);
(Continued)

(58) Field of Classification Search
None
See application file for complete search history.

(56) References Cited

U.S. PATENT DOCUMENTS 4,401,852 A * 8/1983 Noso .................... B60R 16/0373
367/198
6,990,443 B1 * 1/2006 Abe ........................ G10L 17/26
704/222
(Continued)

FOREIGN PATENT DOCUMENTS

JP         5647455 B2    12/2014
KR    10-0705563 B1     4/2007
(Continued)

OTHER PUBLICATIONS

Lu, Lie, Hong-Jiang Zhang, and Hao Jiang. "Content analysis for audio classification and segmentation." IEEE Transactions on speech and audio processing 10.7 (2002): 504-516. (Year: 2002).*

*Primary Examiner* — Jonathan C Kim
(74) *Attorney, Agent, or Firm* — Sughrue Mion, PLLC

(57) ABSTRACT

A method and display device for recognizing voice is provided. A method of recognizing voice by a display device for performing an operation according to a control command of a remote control device includes: receiving an audio signal including user voice transmitted from the remote control device, extracting a signal characteristic of the received audio signal, identifying a noise type related to the extracted signal characteristic with reference to signal characteristics for each of a plurality of pre-stored noise types, and outputting guide information corresponding to the identified noise type. Accordingly, the display device provides uttered voice input guidance appropriate for voice recognition to a user so as to enhance voice recognition performance with respect to uttered voice.

18 Claims, 11 Drawing Sheets

(51) Int. Cl.
  *G10L 15/02*    (2006.01)
  *G10L 15/22*    (2006.01)
  *G10L 25/84*    (2013.01)

(52) U.S. Cl.
  CPC ........ *G10L 25/84* (2013.01); *G10L 2015/223* (2013.01)

(56) References Cited

U.S. PATENT DOCUMENTS

| | | | |
|---|---|---|---|
| 9,721,572 B2* | 8/2017 | Yokoya | H04N 21/233 |
| 2006/0069557 A1* | 3/2006 | Barker | G10L 15/01 |
| | | | 704/234 |
| 2006/0122831 A1 | 6/2006 | Jeong et al. | |
| 2007/0192099 A1* | 8/2007 | Suzuki | G10L 25/48 |
| | | | 704/240 |
| 2007/0219794 A1* | 9/2007 | Park | G06Q 10/10 |
| | | | 704/246 |
| 2008/0167868 A1* | 7/2008 | Kanevsky | G10L 15/24 |
| | | | 704/233 |
| 2009/0030693 A1* | 1/2009 | Shaffer | G10L 25/69 |
| | | | 704/270 |
| 2010/0191525 A1* | 7/2010 | Rabenko | H04L 7/0029 |
| | | | 704/211 |
| 2010/0268533 A1 | 10/2010 | Park et al. | |
| 2011/0069847 A1* | 3/2011 | Takahashi | H04R 3/005 |
| | | | 381/92 |
| 2011/0222785 A1* | 9/2011 | Hirohata | G06K 9/6226 |
| | | | 382/224 |
| 2011/0246189 A1* | 10/2011 | Fox | G10L 25/78 |
| | | | 704/210 |
| 2012/0278075 A1* | 11/2012 | Shammass | G10L 15/08 |
| | | | 704/236 |
| 2013/0185078 A1* | 7/2013 | Tzirkel-Hancock | G10L 15/22 |
| | | | 704/275 |
| 2014/0044279 A1* | 2/2014 | Kim | G10L 21/0272 |
| | | | 381/92 |
| 2014/0282663 A1* | 9/2014 | Lee | H04N 21/44213 |
| | | | 725/18 |
| 2016/0045161 A1 | 2/2016 | Alshaer et al. | |
| 2016/0275968 A1* | 9/2016 | Terao | G10L 25/84 |
| 2017/0111702 A1* | 4/2017 | Jordan | G10L 15/22 |
| 2017/0287490 A1* | 10/2017 | Biswal | G10L 25/81 |

FOREIGN PATENT DOCUMENTS

| | | |
|---|---|---|
| KR | 10-2010-0029591 A | 3/2010 |
| KR | 10-2012-0019003 A | 3/2012 |
| KR | 10-2014-0057831 A | 5/2014 |
| KR | 10-1616054 B1 | 4/2016 |

* cited by examiner

METHOD AND DISPLAY DEVICE FOR RECOGNIZING VOICE

CROSS-REFERENCE TO RELATED APPLICATIONS

This application claims priority from Korean Patent Application No. 10-2016-0103151, filed on Aug. 12, 2016, in the Korean Intellectual Property Office, the disclosure of which is incorporated herein by reference in its entirety.

BACKGROUND

Field

Apparatuses and methods consistent with the present disclosure relate to a display device and a method, and more particularly, a method and display device for recognizing voice of a voice signal contained in a received audio signal.

Description of the Related Art

Voice recognition technologies for controlling various display devices using a voice signal have been widely used. In general, a voice recognition technology refers to a technology of recognizing intention of user uttered voice from an input voice signal and performing an operation according to the intention upon receiving the voice signal from a hardware or software device or a system.

However, the voice recognition technology has a problem in that various sounds generated in a surrounding environment as well as a voice signal of user uttered voice are recognized and, thus, user uttered voice recognition is not appropriately performed or a different operation from an operation intended by a user is performed according to a misrecognized voice recognition result.

That is, the conventional voice recognition technology has a problem in that voice recognition performance appropriate for user uttered voice is degraded when an audio signal including user uttered voice and a sound generated from a surrounding environment is input.

Accordingly, in order to overcome the problem in terms of degradation in voice recognition performance, research has been conducted into a method of removing noise included in an audio signal that is conventionally input in a post processing operation or adjusting a signal size to enhance voice recognition performance.

Nevertheless, when an audio signal with a user uttered voice signal with lower intensity than a noise signal due to sound generated from a surrounding environment is input, there is a problem in that voice recognition appropriate for user uttered voice is not performed.

SUMMARY

Exemplary embodiments of the present disclosure overcome the above-described disadvantages and other disadvantages not described above. Also, the present disclosure is not required to overcome the disadvantages described above, and an exemplary embodiment of the present disclosure may not overcome any of the problems described above.

The present disclosure facilitates voice recognition appropriate for user uttered voice from an audio signal input from a display device.

The present disclosure provides uttered voice input guidance appropriate for voice recognition to a user.

According to an aspect of the present disclosure, a method of recognizing voice by a display device for performing an operation according to a control command of a remote control device includes: receiving an audio signal including user voice transmitted from the remote control device, extracting a signal characteristic of the received audio signal, identifying a noise type related to the extracted signal characteristic with reference to signal characteristics for each of a plurality of pre-stored noise types, and outputting guide information corresponding to the identified noise type.

The outputting may include outputting guide information for guiding remote utterance when the identified noise type is a type of noise input according to proximity utterance of a user.

The outputting may include outputting guide information for guiding control of a peripheral device when the identified noise type is a type of noise into which audio output from the peripheral device is inserted.

The outputting may include outputting guide information for changing an utterance place when the identified noise type is a type of noise generated in a surrounding environment.

The identifying may include, when a similarity between feature values of two consecutive frames among a plurality of frames included in the audio signal and a feature value of a first noise type among the plurality of noise types is equal to or greater than a preset threshold value, identifying the first noise type as a type of noise contained in the audio signal, and feature values of the plurality of frames and the plurality of noise types are each a Mel-Frequency Cepstral Coefficients (MFCC) value indicating frequency characteristic.

The display device may store a table obtained by respectively matching signal characteristics for respective noise types and guide information on the plurality of noise types, and the outputting may include outputting the guide information matched with the identified noise type to at least one of a user interface (UI) and an audio device.

The identifying may include, in response to an audio signal being received through a plurality of microphones, detecting angles of the plurality of audio signals based on a time difference between the plurality of audio signals and identifying a noise type with respect to the detected signal with an angle less than a preset threshold angle among the detected angles.

The identifying may include identifying a noise type with respect to an audio signal input through a preset microphone among the plurality of microphones.

The identifying and the outputting may be performed prior to a pre-processing operation of recognizing voice with respect to a voice signal contained in the audio signal.

According to another aspect of the present disclosure, a display device for performing an operation according to a control command of a remote control device includes: an inputter configured to receive an audio signal including user voice transmitted from the remote control device, an outputter configured to output guide information of the received audio signal, and a processor configured to extract a signal characteristic of the received audio signal, to identify a noise type related to the extracted signal characteristic with reference to signal characteristics for each of a plurality of pre-stored noise types, and to control the outputter to output guide information corresponding to the identified noise type.

The processor may control the outputter to output guide information for guiding remote utterance when the identified noise type is a type of noise input according to proximity utterance of a user.

The processor may control the outputter to output guide information for guiding control of a peripheral device when the identified noise type is a type of noise into which audio output from the peripheral device is inserted.

The processor may control the outputter to output guide information for changing an utterance place when the identified noise type is a type of noise generated in a surrounding environment.

When a similarity between feature values of two consecutive frames among a plurality of frames included in the audio signal and a feature value of a first noise type among the plurality of noise types is equal to or greater than a preset threshold value, the processor may determine the first noise type as a type of noise contained in the audio signal, and feature values of the plurality of frames and the plurality of noise types may each be a MFCC value indicating frequency characteristic.

The display device may further include a storage configured to store a table obtained by respectively matching signal characteristics for respective noise types and guide information on the plurality of noise types, wherein the processor may control the outputter to output the guide information matched with the identified noise type to at least one of a UI and an audio device.

The display device may further include an inputter including a plurality of microphones, wherein, in response to a plurality of audio signals being received through the plurality of microphones, the processor may detect angles of the plurality of audio signals based on a time difference between the plurality of audio signals and identify a noise type with respect to the detected signal with an angle less than a preset threshold angle among the detected angles.

The display device may further include an inputter including a plurality of microphones, wherein the processor may determine other signals except for an audio signal input through a preset microphone among the plurality of microphones as a noise signal.

The processor may identify the noise type and controls output of the guide information prior to a pre-processing operation of recognizing voice with respect to a voice signal contained in the audio signal.

According to the diverse exemplary embodiments of the present disclosure, a display device may provide uttered voice input guidance appropriate for voice recognition to a user so as to enhance voice recognition performance of uttered voice.

Additional and/or other aspects and advantages of the present disclosure will be set forth in part in the description which follows and, in part, will be obvious from the description, or may be learned by practice of the present disclosure.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DETAILED DESCRIPTION OF THE EXEMPLARY EMBODIMENTS

Figure 1:
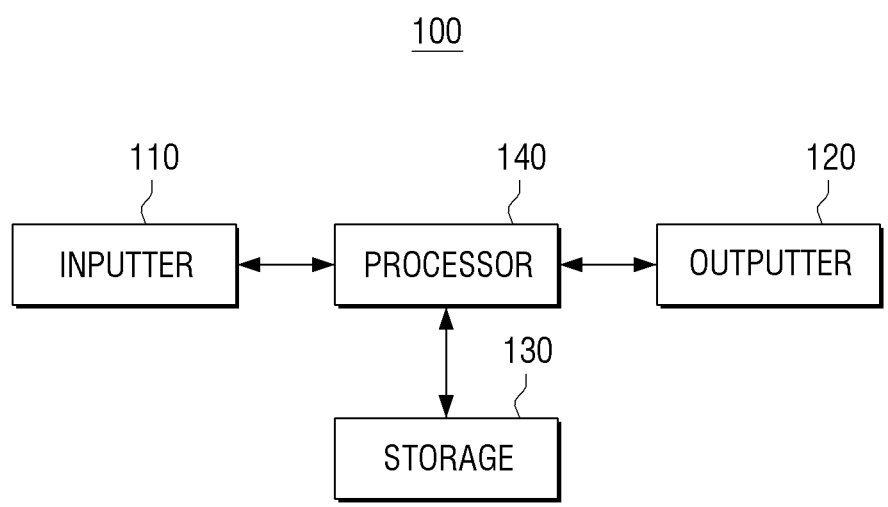
FIG. 1 is a schematic block diagram of a display device for recognizing voice according to an exemplary embodiment of the present disclosure.

Prior to a detailed description of the present disclosure, a method of describing the specification and drawings will be described.

The terms used in the present specification and claims are defined in consideration of functions used in the present specification, and can be changed according to the intent, legal or technological interpretation, or advent of new technologies. In specific cases, the terms can be selected by an applicant. In this case, the meaning of the terms will be described in a corresponding embodiment. Accordingly, definitions of the terms should be understood on the basis of the substantial meaning and the entire description of the present specification instead of simple names of the terms.

The same reference numerals in the drawings denote components or elements that perform substantially the same function. For convenience of description and understanding, the same reference numeral is used in different exemplary embodiments. That is, even if components having the same reference numeral are illustrated in a plurality of drawings, the plurality of drawings does not refer to one exemplary embodiment.

The terms such as "first" and "second" are used herein merely to describe a variety of constituent elements, but the constituent elements are not limited by the terms. The terms are used only for the purpose of distinguishing one constituent element from another constituent element. The terms used in the present specification are used for explaining a specific exemplary embodiment, not limiting the present disclosure. For example, order of use and arrangement of components coupled with the terms should not be limited by the terms. As necessary, the terms may be exchangeably used.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, components, or groups thereof, but do not preclude the presence or addition of one or more other features, integers, steps, operations, elements, components, and/or groups thereof.

In exemplary embodiments of the present disclosure, terms such as "unit", "module", etc. disclosed in the specification mean units for processing at least one function or operation, which may be implemented by hardware, software, or a combination thereof. In addition, a plurality of 'modules', a plurality of 'units', or a plurality of 'parts' may be integrated into at least one module to be embodied as at least one processor except for a 'module' or a 'unit' that needs to be embodied as a specific hardware.

In exemplary embodiments of the present disclosure, it will be understood that when an element is referred to as being "connected to" or "coupled to" another element, it may be directly connected or coupled to the other element or may be indirectly connected or coupled to the other element by intervening elements. In addition, when a certain part "includes" a certain component, this indicates that the part may further include another component instead of excluding another component unless there is no different disclosure.

Reference will now be made in detail to the exemplary embodiments of the present disclosure with reference to the accompanying drawings.

FIG. 1 is a schematic block diagram of a display device 100 for recognizing voice according to an exemplary embodiment of the present disclosure.

The display device 100 may be a device that is capable of recognizing user uttered voice and performs an operation according to a remote control device 200 and, for example, a device such as a smart television (TV). However, the present disclosure is not limited thereto. The display device 100 may be a portable terminal device that is capable of recognizing voice, such as a smartphone or a tablet PC, a remote control device for controlling an operation of the display device 100, or a terminal device such as a set top box for providing content to the display device 100. As illustrated in FIG. 1, the display device 100 may include an inputter 110, an outputter 120, a storage 130, and a processor 140.

The inputter 110 may receive an audio signal including a voice signal of user uttered voice from the remote control device 200 for controlling an operation of the display device 100 and the outputter 120 may output guide information on the received audio signal. The remote control device 200 that transmits the audio signal to the display device 100 will be described below in detail.

The storage 130 may store signal characteristic for each of a plurality of predefined noise types. Here, the signal characteristic for each noise type may a feature value calculated from a signal such as breathing sound, wind sound, music sound, and living noise in a surrounding environment. The signal characteristic for each noise type may be a Mel-Frequency Cepstral Coefficients (MFCC) value indicating frequency characteristic. The storage 130 may store a table obtained by respectively matching the signal characteristics for respective noise types and guide information on a plurality of noise types. The storage 130 will be described below in detail.

The processor 140 may control an overall operation of each component of the display device 100. In particular, the processor 140 may extract signal characteristic of an audio signal input through the inputter 110 and identify a noise type related to the pre-extracted signal characteristic with reference to the signal characteristic for each of a plurality of noise types stored in the storage 130. Then, the processor 140 may control the outputter 120 to output guide information corresponding to the identified noise signal type. Accordingly, the outputter 120 may output guide information for inputting user uttered voice as a voice signal that is capable of being recognized by the display device 100.

In detail, upon receiving user uttered voice through a microphone, the remote control device 200 may transmit an audio signal including a voice signal of the input voice to the display device 100. Accordingly, the inputter 110 may receive the audio signal including the voice signal of the user uttered voice transmitted from the remote control device 200. However, the present disclosure is not limited thereto and, thus, the inputter 110 may receive the audio signal including the voice signal of the user uttered voice from a plurality of microphones 111 included in the display device 100 or another peripheral device.

Upon receiving the audio signal including the voice signal of the user uttered voice, the inputter 110 may divide the received audio signal into frames of a preset time unit and output the frames to the processor 140.

Accordingly, the processor 140 may extract a feature value from an audio signal of a frame unit. When feature values of a plurality of frames included in the received audio signal are extracted, the processor 140 may determine similarity between a feature value for each frame and a feature value for each pre-stored noise type and identify a noise type with similarity of a preset threshold value or more as a type of a noise signal included in the audio signal.

In detail, when similarity between at least two consecutive frames among a plurality of frames included in the audio signal and a feature value of a first noise type among a plurality of pre-stored noise types is equal to or greater than a preset threshold value, the processor 140 may identify the first noise type as a type of noise included in the received audio signal.

Here, feature values of a plurality of frames and a plurality of noise types may each be a MFCC value. However, the present disclosure is not limited thereto and, thus, a well-known feature value extraction algorithm such as Centroid, Roll-off, band spectrum energy, Low energy ratio, Zero crossing rate, and Octave band energy may be used.

Here, MFCC is one of methods of representing power spectrum of an audio signal of a frame unit and is a feature value obtained by applying Cosine Transform to log power spectrum in the frequency domain of a nonlinear Mel scale.

Centroid is a value indicating a center value of frequency components of an audio signal in a frame unit and Roll-off is a value indicating the frequency domain including a frequency component of 85% of the frequency domain of an audio signal in a frame unit. Band spectrum energy may be a value indicating a degree in which energy is spread in a frequency band with respect to an audio signal in a frame unit.

Low energy ratio indicates a ratio of low energy in a frequency band to an audio signal in a frame unit and Zero crossing rate indicates a degree in which values of an audio signal in a frame unit in the time domain cross each other as positive and negative values. In addition, Octave band energy indicates energy of a high frequency component in a frequency band with respect to an audio signal in a frame unit.

In some embodiments, the processor 140 may calculate similarity between a feature value of a plurality of frames and a feature value for each predefined noise type using a Cosine similarity algorithm according to Equation 1 below.

$$\text{similarity} = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}} \quad \text{[Equation 1]}$$

Here, A is a feature value of a first noise type among a plurality of noise types included in a noise model and B is an extracted feature value of a first frame among a plurality of frames included in an audio signal.

When similarity between the first noise type and the first frame is calculated using the Cosine similarity algorithm, if the calculated similarity and a preset threshold value are compared and the similarity is equal to or greater than a preset threshold value, the processor 140 may determine that the first noise type of audio signal is included in the audio signal of the first frame.

When the similarity is less than a preset threshold value, the processor 140 may calculate similarity between a feature value of a first frame and a feature value of a second noise type among a plurality of noise types included in a noise model using the aforementioned Cosine similarity algorithm and determine whether the calculated similarity is equal to or greater than a preset threshold value. As the determination result, when the similarity is equal to or greater than a preset threshold value, the processor 140 may determine that a second noise type of noise is included in an audio signal of the first frame.

Upon determining that a noise signal is included in at least two consecutive frames among a plurality of frames included in an audio signal through the above operation, the processor 140 may acquire and provide guide information corresponding to a noise type of noise included in the at least on two frames.

In some embodiments, feature values of first and second consecutive frames among a plurality of frames may be extracted. Similarity between a feature value of the first frame and a feature value of a first noise type among a plurality of noise types and similarity between a feature value of a second frame and a feature value of a first noise type may be equal to or greater than a preset threshold value.

In this case, the processor 140 may determine that noise is contained in an audio signal input through the inputter 110 and identify noise included in the audio signal as a first noise type.

According to the present exemplary embodiment, when a noise type of noise included in the audio signal is identified, the processor 140 may obtain guide information related to the identified noise type and control the outputter 120 to output the acquired guide information. As described above, the storage 130 may store a table obtained by respectively matching feature values for respective noise types and guide information for respective noise types.

Accordingly, the processor 140 may acquire guide information corresponding to a noise type of noise contained in the audio signal with reference to the guide information for respective noise types pre-stored in the storage 130 and control the outputter 120 to output the acquired guide information.

Accordingly, the outputter 120 may output guide information to at least one of a user interface (UI) and an audio device. When the guide information is output, a user may perform re-utterance based on the corresponding guide information such that the display device 100 may receive an audio signal including a recognizable user voice signal.

According to an exemplary embodiment of the present disclosure, when the identified noise type is a type of noise input according to proximity utterance of a user, the processor 140 may control the outputter 120 to output guide information for guiding remote utterance with reference to guide information for each pre-stored noise type.

Accordingly, the outputter 120 may output guide information for guiding remote utterance to at least one of a UI and an audio device and the user may perform re-utterance based on the guide information at a predetermined interval from the remote control device 200.

According to another exemplary embodiment of the present disclosure, when the identified noise type is a type of noise into which audio output from a peripheral device such as an audio output device is inserted, the processor 140 may control the outputter 120 to output guide information for guiding control of a peripheral device.

Accordingly, the outputter 120 may output guide information for guiding control of a peripheral device to at least one of a UI and an audio device and the user may adjust a volume of a peripheral device that outputs audio and, then, perform re-utterance through the remote control device 200 based on the guide information.

According to another exemplary embodiment of the present disclosure, when the identified noise type is a noise type generated by surrounding environment noise, the processor 140 may control the outputter 120 to output guide information for changing an utterance place.

Accordingly, the outputter 120 may output the guide information for changing the utterance place to at least one of a UI and an audio device and the user may move to another place from a place of pre-utterance and, then, perform re-utterance through the remote control device 200 with respect to the guide information. The inputter 110 may include the plurality of microphones 111 and receive an audio signal including a voice signal of user uttered voice through the plurality of microphones 111. As such, upon receiving the audio signal through the plurality of microphones 111, the processor 140 may determine some of a plurality of audio signals input through the plurality of microphones 111 as a noise signal. That is, upon receiving a plurality of audio signals through the plurality of microphones 111, the processor 140 may select one of a plurality of audio signals as an audio signal for determining a noise type and determine the other noise signals as a noise signal, according to the following exemplary embodiment of the present disclosure.

According to an exemplary embodiment of the present disclosure, the processor 140 may detect an angle for each audio signal based on a time difference between a plurality of audio signals through the plurality of microphones 111. In some embodiments, the processor 140 may determine a direction of an audio signal input through the plurality of microphones 111 using beamforming technology and detect an angle for each audio signal based on the determined direction. As such, when the angle for each audio signal input through the plurality of microphone 111, the processor 140 may compare an angle extracted for each audio signal and a preset threshold angle and determine the other signals except for audio signals detected at an angle less than a preset threshold angle as a noise signal.

However, the present disclosure is not limited thereto and, thus, the processor 140 may determine the other audio signals except for an audio signal with a smallest angle among angles extracted for each audio signal as a noise signal.

According to another exemplary embodiment of the present disclosure, the processor 140 may determine the other audio signals except for an audio signal input through a preset microphone 111 among the plurality of microphones 111 as a noise signal. That is, the processor 140 may select the audio signal input through the preset microphone 111 among the plurality of microphone 111 as an audio signal for determining a noise type and determine an audio signal input through the other microphones 111 as a noise signal.

Upon selecting the audio signal for determining a noise type among a plurality of audio signals, the processor 140 may perform the aforementioned operations to determine whether a noise signal is present in an audio signal, to identify a noise type of the noise included in the audio signal, and to provide guide information corresponding to the identified noise type.

The processor 140 may perform a processing operation of identifying a nose type of noise included in the aforementioned audio signal and controlling the outputter 120 to output guide information corresponding to the identified noise type prior to a pre-processing operation of performing voice recognition of the audio signal.

Accordingly, when determining that a noise signal is not present in the received audio signal or determining that noise is not present in an audio signal including a voice signal of user uttered voice after guide information is provided, the processor 140 may perform a pre-processing operation and perform voice recognition on the corresponding audio signal.

Figure 2:
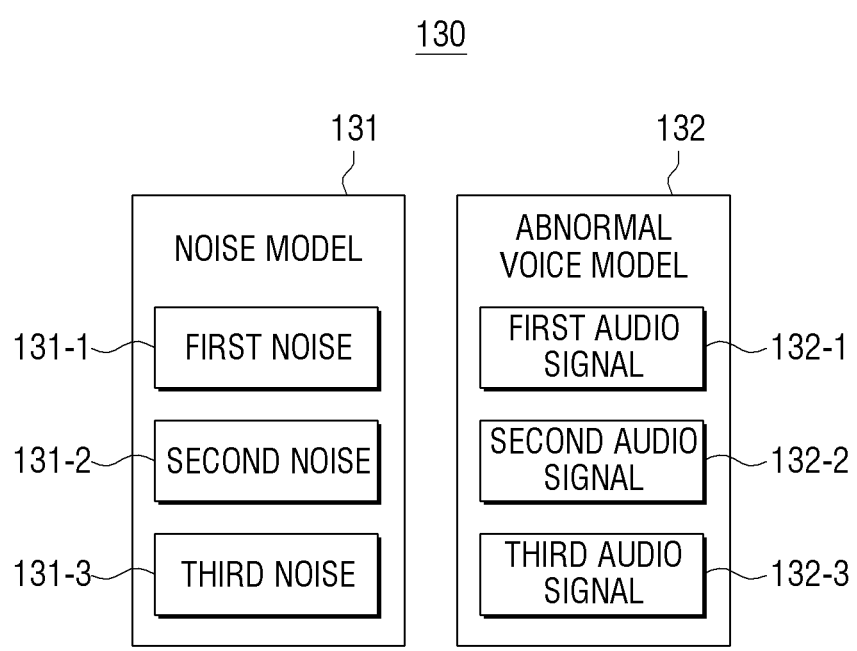
FIG. 2 is a diagram illustrating an example of a storage for storing a noise model for identifying a noise type of noise included in an audio signal according to an exemplary embodiment of the present disclosure.

FIG. 2 is a diagram illustrating an example of a storage 130 for storing a noise model 131 for identifying a noise type of noise included in an audio signal according to an exemplary embodiment of the present disclosure.

As illustrated in FIG. 2, the storage 130 may store the noise model 131 including a feature value for each noise type. As illustrated in FIG. 2, the noise model 131 may include feature values for respective first, second, and third noise types 131-1, 131-2, 131-3. For example, a feature value of the first noise type 131-1 may be a value of breathing sound, a feature value of the second noise type 131-2 may be a value of song sound, and a feature value of the third noise type 131-3 may be a value of a living noise sound generated in a surrounding environment.

Accordingly, as described above, the processor 140 may determine similarity between a feature value for each frame included in the received audio signal and feature values for each of the first to third noise types 131-1 to 131-3 included in the noise model 131 and identify a noise type with similarity of a preset threshold value or more among first to third noise types as a type of noise included in the audio signal.

The noise model 131 may further include guide information on each of the first to third noise types 131-1 to 131-3. Accordingly, upon identifying the type of noise included in the received audio signal, the processor 140 may acquire guide information corresponding to the identified noise type and output the acquired guide information to at least one of a UI and an audio device through the outputter 120.

As illustrated in FIG. 2, the storage 130 may store an abnormal voice model 132 including a feature value for each type of a plurality of audio signals. Here, the abnormal voice model 132 may be a model for determining whether an audio signal that does not include noise for each of a plurality of noise types included in the noise model 131 is voice-recognizable. The first, second, and third audio signals 132-1, 132-2, 132-3 included in the abnormal voice model 132 may be an audio signal or a silent signal which is smaller or greater than a level in which user uttered voice is recognizable. Accordingly, the abnormal voice model 132 may include a feature value for each of the first to third audio signals 132-1 to 132-3 and guide information for each of the first to third audio signals 132-1 to 132-3.

Accordingly, as described above, the processor 140 may identify a type of the received audio signal based on the feature value for each of the first to third audio signals 132-1 to 132-3 included in the abnormal voice model 132 and provide guide information on the identify audio signal type.

In addition, the processor 140 may determine a type of the received audio signal based on a feature value for each of the first to third noise types 131-1 to 131-3 included in the noise model 131 stored in the storage 130 and a feature value for each of the first to third audio signals 132-1 to 132-3 included in the abnormal voice model 132 and provide guide information appropriate for the determined type of the audio signal.

Hereinafter, provision of guide information based on a type of an audio signal input from the display device 100 will be described in detail according to an exemplary embodiment of the present disclosure.

Figure 3:
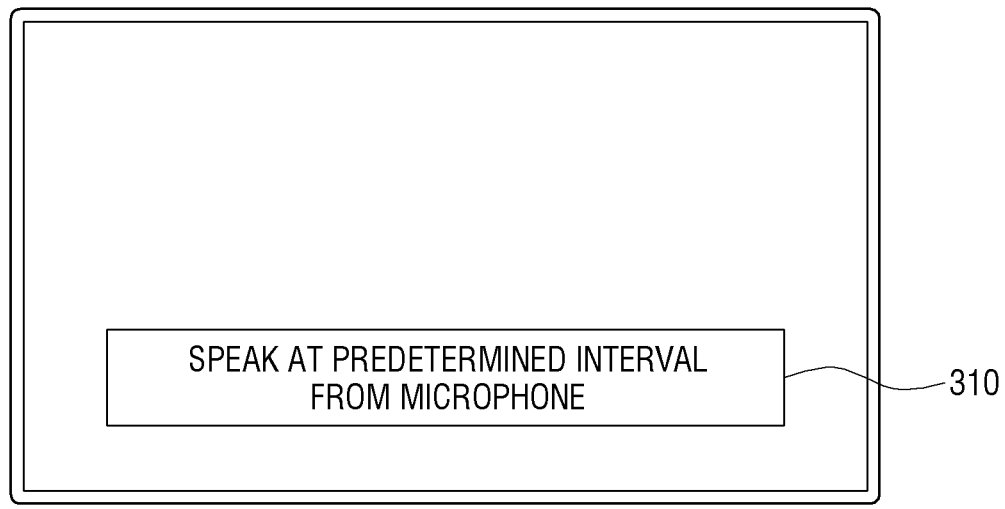
FIG. 3 is a diagram illustrating provision of guide information based on a type of an audio signal input from a display device according to an exemplary embodiment of the present disclosure.

FIG. 3 is a diagram illustrating provision of guide information based on a type of an audio signal input from a display device according to an exemplary embodiment of the present disclosure.

As described above, upon receiving an audio signal including a voice signal of user uttered voice, the processor 140 may extract a feature value for each frame included in the received audio signal and determine whether similarity between the extracted feature value for each frame and a feature value for each noise type included in a noise model pre-stored in the storage 130 is equal to or greater than a preset threshold value.

In this case, as described with reference to FIG. 2, the processor 140 may further determine whether similarity between feature values for types of a plurality of audio signals included in an abnormal voice model pre-stored in the storage 130 is equal to or greater than a preset threshold value.

As the determination result, the similarity between feature values of two consecutive frames among a plurality of frames included in the received audio signal and a feature value of a noise type related to breathing sound among a plurality of noise types may be determined to be equal to or greater than a preset threshold value. Upon determining that the noise type of noise is included in the audio signal, the processor 140 may acquire guide information from the noise type related to breathing sound, which is determined as the type of noise included in the audio signal, and provide the guide information.

Accordingly, the display device 100 may display a UI 310 of "Speak at predetermined interval from microphone" based on the pre-acquired guide information on a monitor, as illustrated in FIG. 3. However, the present disclosure is not limited thereto and, thus, the display device 100 may output audio "Speak at predetermined interval from microphone" through a speaker.

Accordingly, a user may re-utter at a predetermined interval from the remote control device 200 that is capable of recognizing voice according to the guide information output from the display device 100. Accordingly, the display device 100 may receive the audio signal of the re-uttered voice based on the guide information from the remote control device 200 and perform voice recognition so as to enhance a voice recognition rate of user uttered voice.

Figure 4:
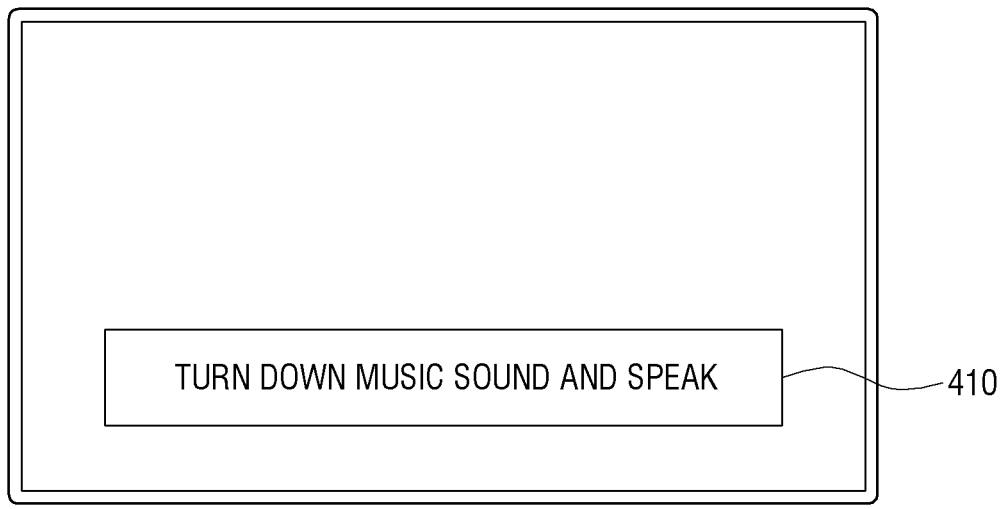
FIG. 4 is a diagram illustrating provision of guide information based on a type of an audio signal input from a display device according to an exemplary embodiment of the present disclosure.

FIG. 4 is a diagram illustrating provision of guide information based on a type of an audio signal input from a display device according to another exemplary embodiment of the present disclosure.

As described above, upon receiving an audio signal including a voice signal of user uttered voice, the processor 140 may extract a feature value for each frame included in the received audio signal and determine whether similarity between the extracted feature value for each frame and a feature value for each noise type included in a noise model pre-stored in the storage 130 is equal to or greater than a preset threshold value.

In this case, as described with reference to FIG. 2, the processor 140 may further determine whether similarity between feature values for types of a plurality of audio signals included in an abnormal voice model pre-stored in the storage 130 is equal to or greater than a preset threshold value.

As the determination result, the similarity between feature values of two consecutive frames among a plurality of frames included in the received audio signal and a feature value of a noise type related to music sound among a plurality of noise types may be determined to be equal to or greater than a preset threshold value. Upon determining that the noise type of noise is included in the audio signal, the processor 140 may acquire guide information from the noise type related to music sound, which is determined as the type of noise included in the audio signal, and provide the guide information.

Accordingly, the display device 100 may display a UI 410 of "Turn down music sound and speak" based on the pre-acquired guide information on a monitor, as illustrated in FIG. 4. However, the present disclosure is not limited thereto and, thus, the display device 100 may output audio "Turn down music sound and speak" through a speaker.

Accordingly, a user may adjust a volume of music output from a peripheral device according to the guide information output from the display device 100 and then re-utter using the remote control device 200. Accordingly, the display device 100 may receive the audio signal of the re-uttered voice based on the guide information from the remote control device 200 and perform voice recognition so as to enhance a voice recognition rate of user uttered voice.

Figure 5:
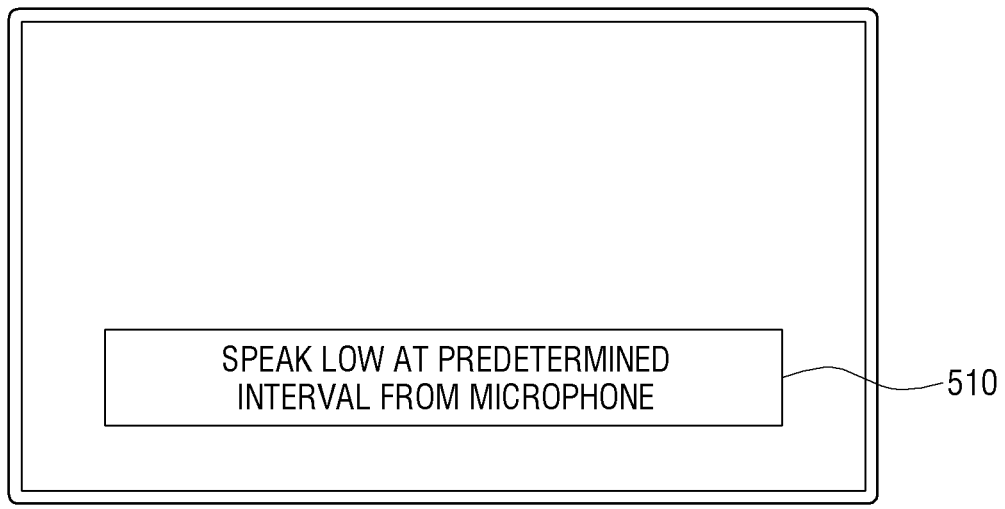
FIG. 5 is a diagram illustrating provision of guide information based on a type of an audio signal input from a display device according to an exemplary embodiment of the present disclosure.

FIG. 5 is a diagram illustrating provision of guide information based on a type of an audio signal input from a display device according to an exemplary embodiment of the present disclosure.

As described above, upon receiving an audio signal including a voice signal of user uttered voice, the processor 140 may extract a feature value for each frame included in the received audio signal and determine whether similarity between the extracted feature value for each frame and a feature value for each noise type included in a noise model pre-stored in the storage 130 is equal to or greater than a preset threshold value.

In this case, as described with reference to FIG. 2, the processor 140 may further determine whether similarity between feature values for types of a plurality of audio signals included in an abnormal voice model pre-stored in the storage 130 is equal to or greater than a preset threshold value.

As the determination result, the similarity between feature values of two consecutive frames among a plurality of frames included in the received audio signal and a feature value of a noise type related to breathing sound among a plurality of noise types may be determined to be equal to or greater than a preset first threshold value.

In addition, similarity between feature frames of two consecutive frames among a plurality of frames included in the received audio signal and a feature value of a type of a first audio signal among types of a plurality of audio signals may be determined to be equal to or greater than a preset second threshold value.

Here, the first audio signal may be a signal indicating a voice signal greater than a voice signal that is recognizable by the display device 100. Two frames determined to include a voice signal of a type of the first audio signal may be different or the same as two frames determined to include a noise signal of a noise type related to breathing sound.

Upon determining that a noise signal of a noise type related to breathing sound and a voice signal of the first audio signal type are included in the audio signal, the processor 140 may acquire respective audio information items from the type of the noise signal related to breathing sound and the first audio signal type.

Accordingly, the display device 100 may display a UI 510 of "Speak low at predetermined interval from microphone" based on the pre-acquired guide information on a monitor, as illustrated in FIG. 5. However, the present disclosure is not limited thereto and, thus, the display device 100 may output audio "Speak low at predetermined interval from microphone" through a speaker.

Accordingly, a user may re-utter lower than pre-utterance at a predetermined interval from the remote control device 200 according to the guide information output from the display device 100. Accordingly, the display device 100 may receive the audio signal of the re-uttered voice based on the guide information from the remote control device 200 and perform voice recognition so as to enhance a voice recognition rate of user uttered voice.

Figure 6:
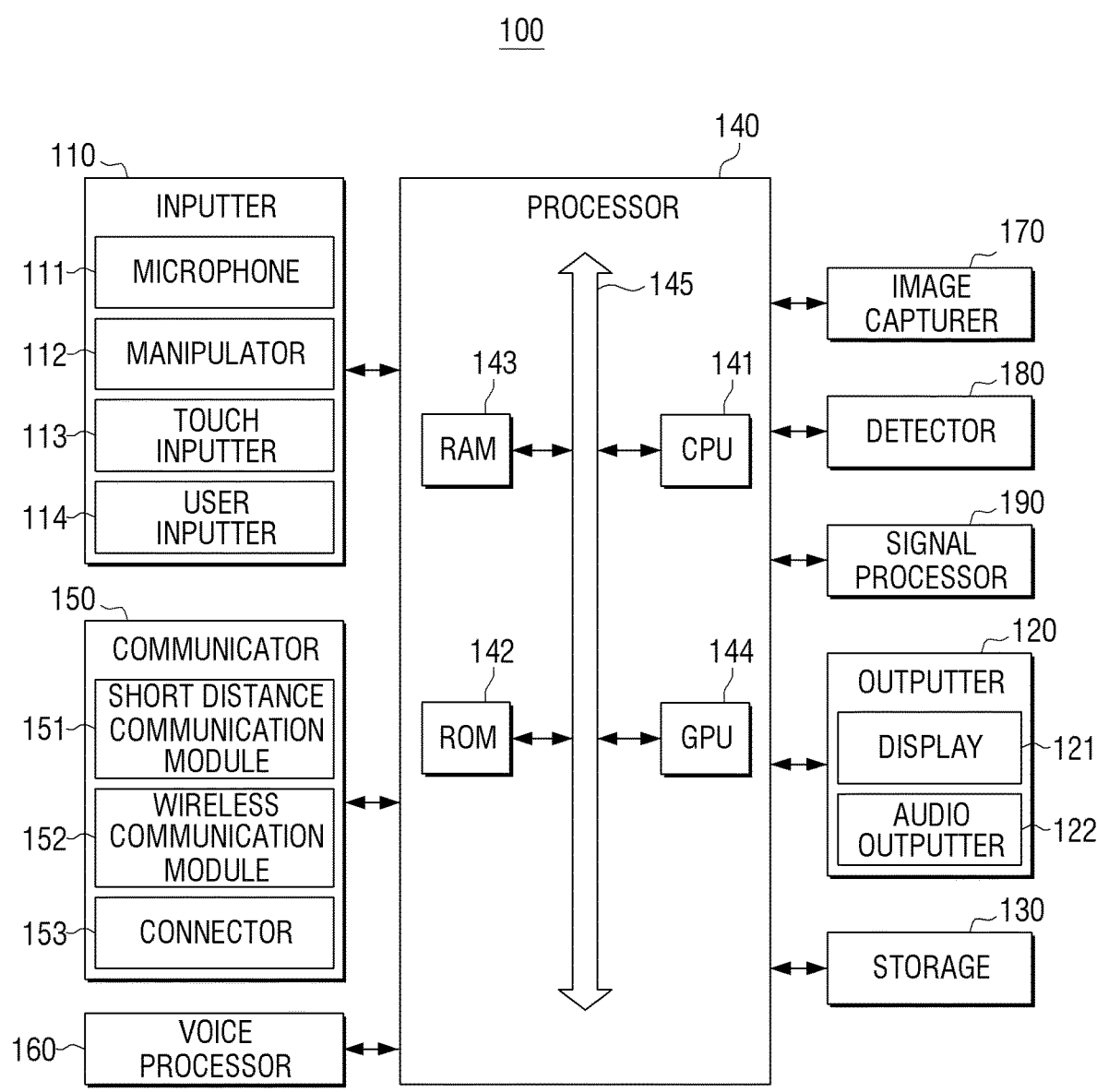
FIG. 6 is a detailed block diagram of a display device that is capable of recognizing voice according to an exemplary embodiment of the present disclosure.

FIG. 6 is a detailed block diagram of a display device 100 that is capable of recognizing voice according to an exemplary embodiment of the present disclosure.

As illustrated in FIG. 6, the display device 100 may further include a communicator 150, a voice processor 160, an image capturer 170, a detector 180, and a signal processor 190 in addition to the aforementioned components including the inputter 110, the outputter 120, the storage 130, and the processor 140.

First, as described above, the inputter 110 may include the plurality of microphones 111 for receiving an audio signal including a voice signal of user uttered voice. In addition, the inputter 110 may further include a manipulator 112, a touch inputter 113, and a user inputter 114. Upon receiving an audio signal including a voice signal, the plurality of microphones 111 may divide the received audio signal into frames in a preset time unit and output the frames to the processor 140. Accordingly, the processor 140 may extract a feature value from each frame included in the audio signal input through the microphone 111.

The manipulator 112 may be embodied as a key pad including various functional keys, numeric keys, special keys, character keys, and so on and when a display 121, to be described later, is embodied in the form of a touchscreen, the touch inputter 113 may be embodied as a touch pad that constitutes an interlayer structure together with the display 121. In this case, the touch inputter 113 may receive a touch command on an icon displayed through the display 121 to be described later.

The user inputter 114 may receive an IR signal or an RF signal from the remote control device 200. Here, the IR or RF signal may be an audio signal including a control signal for controlling an operation of the display device 100 or a voice signal of user uttered voice.

Accordingly, the processor 140 may control an operation of the display device 100 or perform a voice recognition related operation based on the IR or RF signal input through the user inputter 114.

The communicator 150 may perform data communication with at least one peripheral terminal device. According to an exemplary embodiment of the present disclosure, the communicator 150 may transmit a voice signal of user uttered voice to a voice recognition server and receive the voice recognition result in the form of a text recognized from a voice recognition server. According to another exemplary embodiment of the present disclosure, the communicator 150 may perform data communication with a web server and receive content corresponding to a user command or a search result related to content.

As illustrated in FIG. 6, the communicator 150 may include a short distance communication module 151, a wireless communication module 152 such as a wireless LAN module, and a connector 153 including at least one of wired communication modules such as a high-definition multimedia interface (HDMI), a universal serial bus (USB), and institute of electrical and electronics engineers (IEEE) 1394.

The short distance communication module 151 may wirelessly perform short-distance communication between the display device 100 and a peripheral terminal device. The short distance communication module 151 may include at least one of a Bluetooth module, an infrared data association (IrDA) module, a near field communication (NFC) module, a WiFi module, and a Zigbee module.

The wireless communication module 152 may be a module that is connected to an external network and perform communication according to a wireless communication protocol such as IEEE. In addition, the wireless communication module may further include a mobile communication module that is connected to a mobile communication network and perform communication according to various mobile communication standards such as $3^{rd}$ generation (3G), $3^{rd}$ generation partnership project (3GPP), and long term evolution (LTE).

As such, the communicator 150 may be embodied using the aforementioned various short-distance communication method and, as necessary, may employ other communication technologies.

The connector 153 may provide an interface with various source devices such as USB 2.0, USB 3.0, HDMI, and IEEE 1394. The connector 153 may receive content data transmitted from a content providing server through a wired cable connected to the connector 153 or transmit pre-stored content data to an external recording medium. The connector 153 may receive power from a power source through a wired cable that is physically connected to the connector 153.

The voice processor 160 may perform voice recognition on a voice period from a signal determined not to include a noise signal among audio signals input through the inputter 110. In detail, upon detecting the voice period from the audio signal input, the voice processor 160 may attenuate a signal of the other period except for the voice period with respect to the detected voice period, perform a pre-processing operation for amplifying a signal of the voice period and, then, perform voice recognition on user uttered voice using a voice recognition algorithm such as a speech to text (STT) with respect to the amplified voice period.

The image capturer 170 may capture a still image or a video according to a user command and include a plurality of cameras such as a front camera and a rear camera.

The detector 180 may detect various operating states of the display device 100 and user interactions. In particular, the detector 180 may detect a grip state in which a user grips the display device 100. In detail, the display device 100 may be rotated or inclined in various directions. In this case, the detector 180 may detect inclination and so on of the display device 100 gripped by a user based on a rotation or gravity direction using at least one of a terrestrial magnetism sensor, a gyro sensor, and an acceleration sensor.

The signal processor 190 may process image data and audio data of content received through the communicator 150 or content stored in the storage 130 according to a control command of the processor 140. In detail, the signal processor 190 may perform various image processing operations such as decoding, scaling, noise filtering, frame rate conversion, and resolution conversion on image data included in content. In addition, the signal processor 190 may perform various audio signal processing operations such as decoding, amplification, and noise filtering on audio data included in content.

The outputter 120 for outputting guide information as at least one of a UI or an audio device may output guide information through at least one of the display 121 and an audio outputter 122. That is, the display 121 may display the guide information in the form of a UI and the audio outputter 122 may output audio data of the guide information in the form of audible sound.

In addition, the display 121 may display image data that is image signal-processed by the signal processor 190 and the audio outputter 122 may output audio data that is audio signal-processed by the signal processor 190 in the form of audible sound.

The display 121 for displaying guide information in the form of a UI or displaying image data of content may be embodied as a liquid crystal display (LCD), an organic light emitting display (OLED), a plasma display panel (PDP), or the like. In particular, the display 121 may be embodied in the form of a touchscreen that constitutes an interlayer structure together with the touch inputter 113.

The aforementioned processor 140 may include a central process unit (CPU) 141, a read-only memory (ROM) 142, a random-access memory (RAM) 143, and a graphics processing unit (GPU) 144 and the CPU 141, the ROM 142, the RAM 143, and the GPU 144 may be connected to each other through a bus 145.

The CPU 141 may access the storage 130 and perform booting using an operating system (OS) stored in the storage 130. The CPU 141 may perform various operations using various programs, contents, data, and so on, which are stored in the storage 130.

The ROM 142 may store a command set and so on for system booting. When a turn-on command is input and power is supplied to the CPU 141, the CPU 141 may copy the OS stored in the storage 130 to the RAM 143 according to a command stored in the ROM 142 and execute the OS to boot a system. When booting is completed, the CPU 141 may copy various programs stored in the storage 130 to the RAM 143 and execute the programs copied to the RAM 143 to perform various operations.

A GPU 144 may generate a display image including various objects such as an icon, an image, and a text. In detail, the GPU 144 may calculate an attribute value such as a coordinate value, a shape, and color for displaying each object according to a layout based on a received control command and generate display images with various layouts including an object based on the calculated attribute value.

The processor 140 may be combined with the aforementioned components so as to be embodied as a single chip system (system-on-a-chip (SOC) or system on chip (SoC)).

The aforementioned operation of the processor 140 may be performed according to a program stored in the storage 130. Here, the storage 130 may be embodied as at least one of the ROM 142, the RAM 143, a memory card (e.g., SD card and memory stick) detachable/installable in the display device 100, a non-volatile memory, a volatile memory, a hard disk drive (HDD), and a solid state drive (SSD).

Thus far, each component and an operation of the display device 100 that is recognizable voice according to the present disclosure have been described in detail.

As described above, hereinafter, each component of the remote control device 200 that receives user uttered voice and transmits an audio signal including a voice signal of the input uttered voice to the display device 100 will be described in detail.

Figure 7:
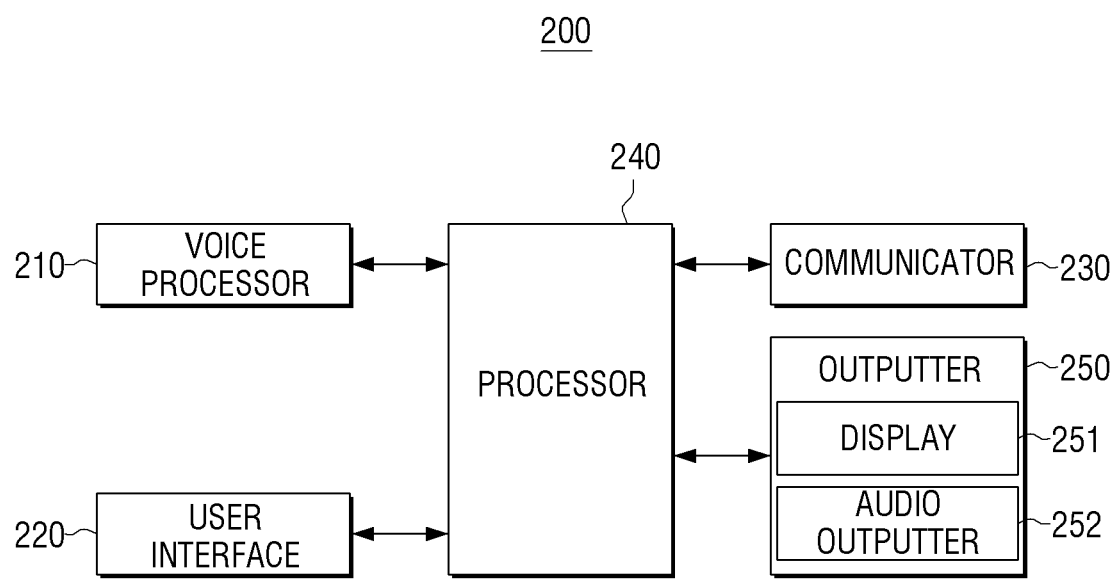
FIG. 7 is a block diagram of a remote control device according to an exemplary embodiment of the present disclosure.

FIG. 7 is a block diagram of the remote control device 200 according to an exemplary embodiment of the present disclosure.

The remote control device 200 may be a control device for controlling an operation of the display device 100. That is, upon receiving a user command, the remote control device 200 may transmit a control signal corresponding to the input user command to the display device 100. Accordingly, the display device 100 may perform an operation based on the control signal received from the remote control device 200. In addition, the remote control device 200 may receive user uttered voice through a microphone and transmit an audio signal including a voice signal of the input uttered voice to the display device 100. Accordingly, upon receiving an audio signal transmitted from the remote control device 200, the display device 100 may identify a noise type of noise contained in the received audio signal and provide guide information corresponding to the identified noise type, as described above.

As such, the remote control device 200 for transmitting at least one of a control signal corresponding to a user command and an audio signal of user uttered voice to the display device 100 may include a voice processor 210, a user interface 220, a communicator 230, and a processor 240, as illustrated in FIG. 7.

The voice processor 210 may generate a voice signal of uttered voice input through at least one microphone. In detail, upon receiving an analog type of user uttered voice through a microphone, the voice processor 210 may sample the input uttered voice and convert the input uttered voice into a digital signal.

The user interface 220 may receive a user command and, in particular, receive a user command for entrance into a voice recognition mode. The user interface 220 may be embodied in the form of a touch pad, a key pad including various functional keys, numeric keys, special keys, character keys, and so on, or a touch screen.

When the user interface 220 is embodied in the form of a touchscreen, the user interface 220 may receive a UI image selected among UI images displayed through a display 251 of an outputter 250 to be described later, as a user command.

The communicator 230 may wirelessly communicate with the display device 100 according to a short distance wireless communication method such as Bluetooth, Zigbee, infrared communication, and RF communication and transmit a control signal corresponding to a user command input through the user interface 220 to the display device 100. Accordingly, upon receiving a control signal corresponding to a user command from the remote control device 200, the display device 100 may perform an operation corresponding to the received control signal.

The communicator 230 may transmit an audio signal including the user uttered voice to the display device 100. In this case, as described above, the display device 100 may identify a noise type of a noise contained in the input noise signal and provide guide information corresponding to the identified noise type.

The processor 240 may control an overall operation of each component included in the remote control device 200. In particular, upon receiving user uttered voice through a microphone, the processor 240 may control the voice processor 210 and the communicator 230 to perform signal-processing on the input uttered voice and to transmit an audio signal including the signal-processed voice signal to the display device 100.

Accordingly, the communicator 230 may transmit an audio signal including a voice signal of user uttered voice to the display device 100 and the display device 100 may identify a noise type of noise contained in the received audio signal and provide guide information corresponding to the identified noise type, as described above.

The processor 240 may identify a noise type from the audio signal including a voice signal of the user uttered voice and transmit the identified noise type information to the display device 100 through the communicator 230.

A processing operation of identifying a noise type from an audio signal may be the same as the aforementioned processing operation of identifying a noise type from an audio signal by the display device 100.

That is, according to the present disclosure, the remote control device 200 may identify a noise type from an audio signal including a voice signal of user uttered voice and transmit the identified noise type information to the display device 100.

In this case, the display device 100 may output guide information corresponding to a type of noise contained in an audio signal of user uttered voice to at least one of a UI and an audio device based on the noise type information received from the remote control device 200.

According to the present disclosure, the remote control device 200 for controlling an operation of the display device 100 may identify a noise type from an audio signal including a voice signal of user uttered voice and provide guide information corresponding to the identified noise type.

In detail, the remote control device 200 may further include the outputter 250 including the display 251 and an audio outputter 252 in addition to the aforementioned components. In this case, the processor 240 may identify a noise type from an audio signal including a voice signal of user uttered voice and control the outputter 250 to output guide information corresponding to the identified noise type among guide information items for each of a plurality of pre-stored noise types. According to the control command, the outputter 250 may output guide information corresponding to a noise type identified through at least one of the display 251 and the audio outputter 252. That is, the display 251 may display the guide information in the form of a UI and the audio outputter 252 may output audio data of the guide information in the form of audible sound.

A processing operation of identifying a noise type from an audio signal including a voice signal of the input uttered voice may be the same as the aforementioned processing operation of identifying a noise type from an audio signal by the display device 100 and providing guide information corresponding to the identified noise type and, thus, a detailed description thereof will be omitted here.

Hereinafter, a method of recognizing voice of an audio signal including a voice signal by the display device 100 according to the present disclosure will be described in detail.

Figure 8:
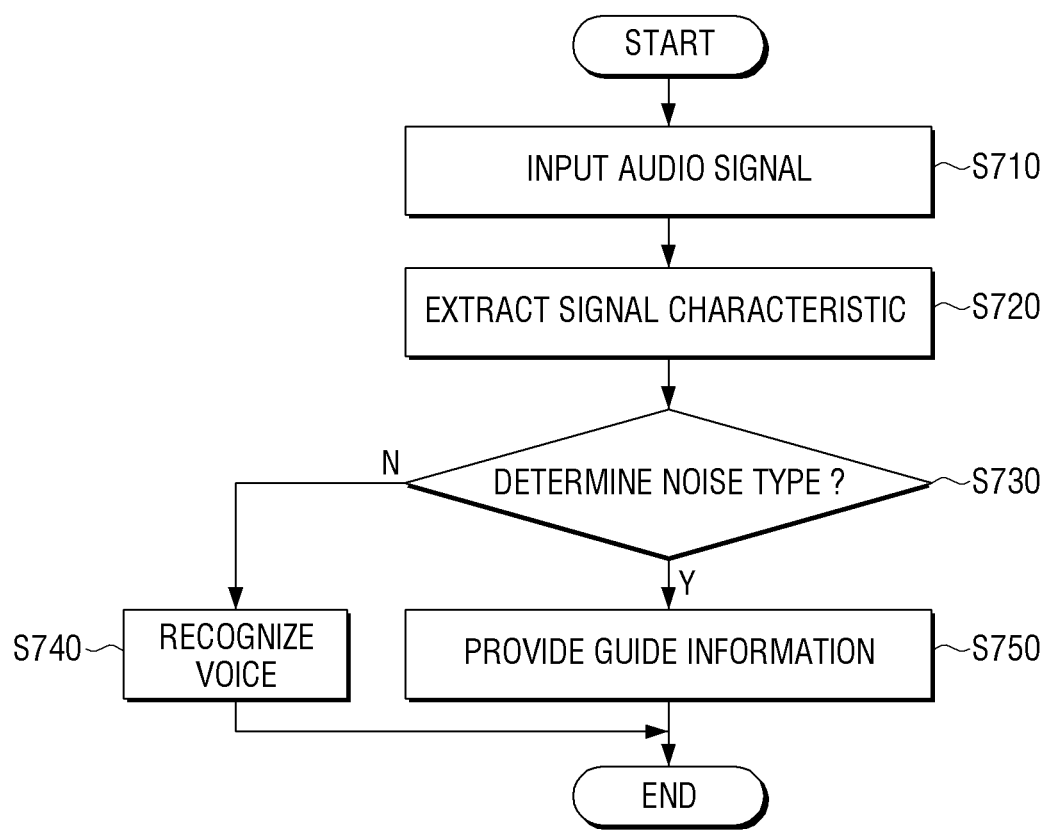
FIG. 8 is a first flowchart of a method of recognizing voice by a display device according to an exemplary embodiment of the present disclosure.

FIG. 8 is a first flowchart of a method of recognizing voice by a display device according to an exemplary embodiment of the present disclosure.

As illustrated in FIG. 8, upon receiving an audio signal including a voice signal of user uttered voice from the remote control device 200, the display device 100 may extract signal characteristic of the received audio signal (S710 and S720).

Then, the display device 100 may determine a noise type related to the signal characteristic extracted from the received audio signal with reference to signal characteristic for each of a plurality of pre-stored noise types (S730). As the determination result, when a type of a noise signal contained in the received audio signal is not determined, the display device 100 may recognize voice from the audio signal contained in the received audio signal (S740). However, the present disclosure is not limited thereto and, thus, upon determining that there is no noise signal in the received audio signal, the display device 100 may recognize voice from the voice signal contained in the audio signal.

Upon determining a type of noise contained in the received audio signal, the display device 100 may acquire guide information corresponding to a noise type of noise contained in the audio signal and provide the guide information (S750).

In detail, the display device 100 may display the guide information corresponding to a noise type of a noise signal contained in the audio signal in the form of a UI or output the audio information through a speaker.

According to an exemplary embodiment of the present disclosure, when the identified noise type is a type of noise input according to proximity utterance of a user, the display device 100 may output guide information for guiding remote utterance through at least one of a UI and an audio device.

According to another exemplary embodiment of the present disclosure, when the identified noise type is a type of noise to which audio output from a peripheral device is inserted, the display device 100 may output guide information for guiding control of a peripheral device through at least one of a UI and an audio device.

According to another exemplary embodiment of the present disclosure, when the identified noise type is a type of noise generated from a surrounding environment, the display device 100 may output guide information for changing an utterance plate through at least one of a UI and an audio device.

When the guide information is output, a user may re-utter based on the corresponding guide information. Accordingly, the display device 100 may receive an audio signal of re-uttered uttered voice based on the guide information and perform voice recognition so as to enhance a voice recognition rate of user uttered voice.

Hereinafter, a method of determining a type of noise contained in an audio signal by the display device 100 will be described in detail.

Figure 9:
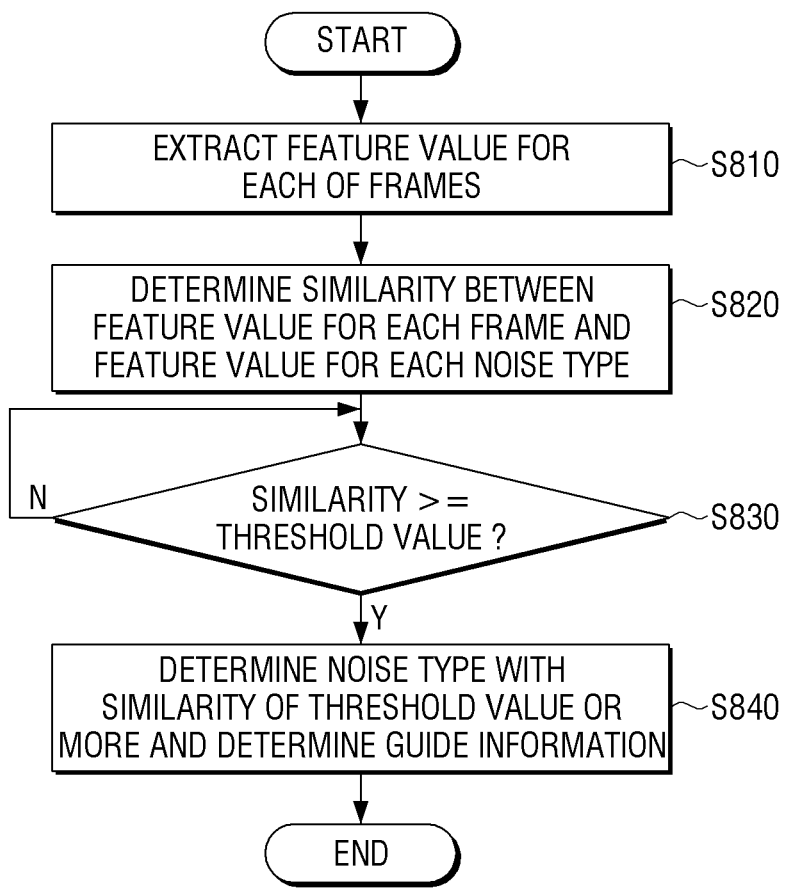
FIG. 9 is a flowchart of a method of determining a type of a noise signal contained in an audio signal by a display device according to an exemplary embodiment of the present disclosure.

FIG. 9 is a flowchart of a method of determining a type of a noise signal contained in an audio signal by the display device 100 according to an exemplary embodiment of the present disclosure.

As illustrated in FIG. 9, upon receiving an audio signal including a voice signal, the display device 100 may configure the received audio signal in units of a plurality of frames and extract a feature value for each audio signal of a plurality of frames. (S810).

Here, a feature value for each frame may be a MFCC value. However, the present disclosure is not limited thereto and, thus, a well-known feature value extraction algorithm such as Centroid, Roll-off, band spectrum energy, Low energy ratio, Zero crossing rate, and Octave band energy may be used.

As such, upon extracting a feature value for each of a plurality of frames included in the received audio signal, the display device 100 may determine similarity between a feature value for each frame and a feature value for each noise type included in a pre-stored noise model (S820). In some embodiments, the display device 100 may calculate similarity between a feature value for each frame and a feature value for each of a plurality of noise types included in a pre-stored noise model using a Cosine similarity algorithm according to Equation 1 above.

Then, the display device 100 may compare the similarity between the feature value for each frame and the feature value for each noise type included in the pre-stored noise model with a preset threshold value (S830). According to the comparison result, upon determining that there is a noise type with similarity with a preset threshold value or more, the display device 100 may determine a noise type with similarity with a preset threshold value or more as a type of a noise signal contained in the audio signal and acquire guide information corresponding to the determined noise type (S840).

In detail, upon extracting a feature value of a first frame of a plurality of frames, the display device 100 may determine similarity between feature values of a plurality of noise types included in a noise model using a Cosine similarity algorithm.

For example, upon calculating similarity between a first frame and a first noise type of a plurality of types, the calculated similarity is compared with a preset threshold value and the similarity is equal to or greater than the preset threshold value and, in this case, the display device 100 may determine that an audio signal of a first noise type is contained in the audio signal of the first frame.

When the similarity is less than a preset threshold value, the display device 100 may calculate similarity between a feature value of a first frame and a feature value of a second noise type among a plurality of noise types included in a noise model using the aforementioned Cosine similarity algorithm and determine whether the calculated similarity is equal to or greater than a preset threshold value. As the comparison result, when the similarity is equal to or greater than the present threshold value, the display device 100 may determine that an audio signal of a second noise type is contained in an audio signal of a first frame.

Upon determining that a noise signal is contained in at least two consecutive frames among a plurality of frames including an audio signal through the series of operations, the display device 100 may acquire guide information corresponding to a noise type of a noise signal included in at least two frames. Then, the display device 100 may display the acquired guide information in the form of a UI or output audio through a speaker.

When the guide information is output, a user may re-utter based on the corresponding guide information. Accordingly, the display device 100 may receive an audio signal of re-uttered uttered voice based on the guide information and perform voice recognition so as to enhance a voice recognition rate of user uttered voice.

Figure 10:
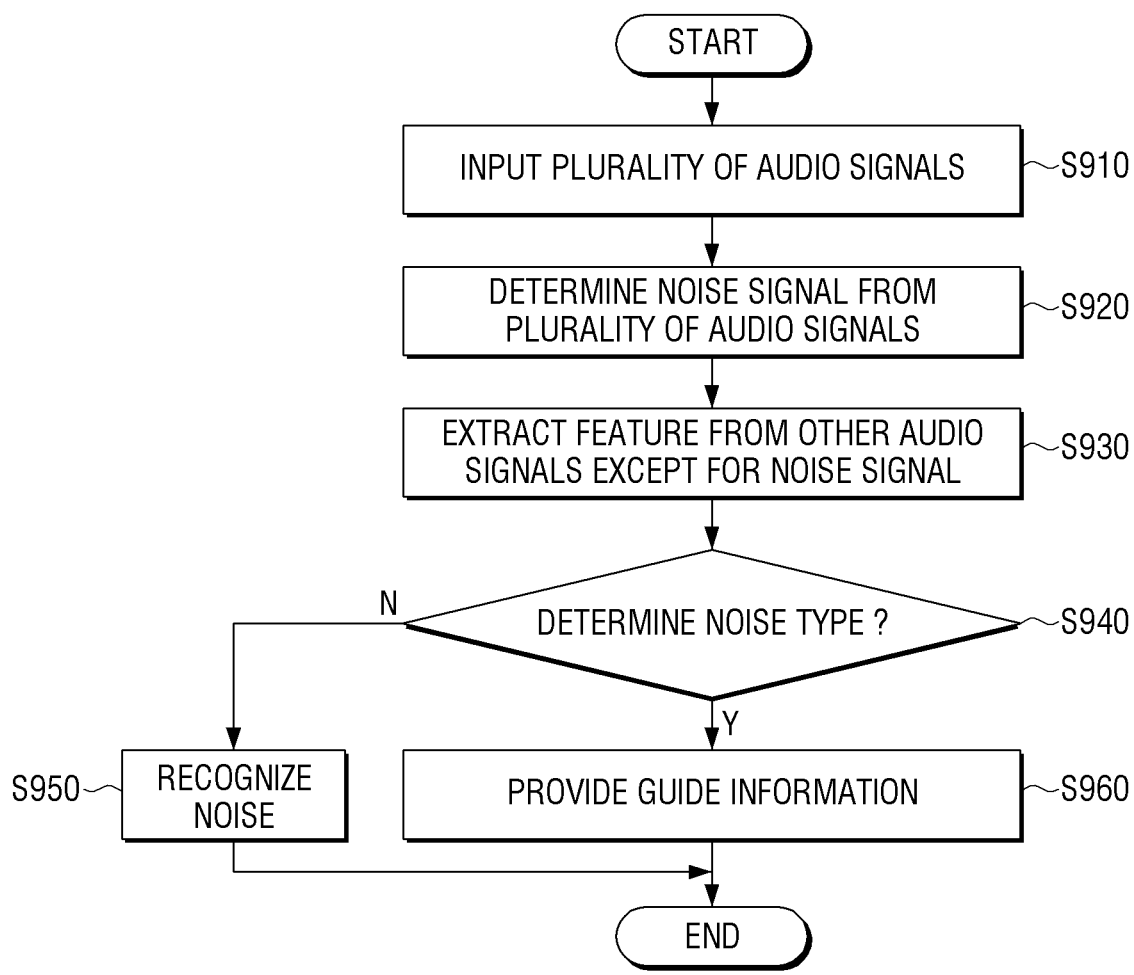
FIG. 10 is a flowchart of a method of recognizing voice by a display device according to an exemplary embodiment of the present disclosure.

FIG. 10 is a second flowchart of a method of recognizing voice by a display device according to another exemplary embodiment of the present disclosure.

As illustrated in FIG. 10, upon receiving an audio signal including a voice signal of user uttered voice through a plurality of microphones, the display device 100 may determine a noise signal from each audio signal from each of a plurality of microphones (S910 and S920).

That is, upon receiving a plurality of audio signals through a plurality of microphones, the display device 100 may select one of a plurality of audio signals as an audio signal for determining a noise type and determine the other noise signals as a noise signal, according to the following exemplary embodiment of the present disclosure.

According to an exemplary embodiment of the present disclosure, the display device 100 may detect an angle for each audio signal based on a time difference between a plurality of audio signals input through a plurality of microphones, determine an audio signal for determining a noise type among a plurality of audio signals based on the detected angle, and determine the other audio signals as a noise signal.

According to another exemplary embodiment of the present disclosure, the display device 100 may determine the other signals except for audio signals input through a preset microphone among a plurality of microphones as a noise signal.

Then, the display device 100 may extract signal characteristic from the audio signal determined as the audio signal for determining a noise type among a plurality of audio signals (S930). Then, the display device 100 may compare the extracted signal characteristic with a pre-stored noise model and determine a type of a noise signal contained in the audio signal (S940). As the determination result, when a type of a noise signal contained in the received audio signal is not determined, the display device 100 may recognize voice from the voice signal contained in the received audio signal (S950). However, the present disclosure is not limited thereto and, thus, upon determining that there is no noise signal in the received audio signal, the display device 100 may recognize voice from the voice signal contained in the audio signal.

Upon determining a type of a noise signal contained in the received audio signal, the display device 100 may acquire guide information corresponding to a noise type of a noise signal contained in the audio signal and provide the guide information (S960).

In detail, the display device 100 may display guide information corresponding to a noise type of the noise signal contained in the audio signal in the form of a UI or output audio through a speaker.

When the guide information is output, a user may re-utter based on the corresponding guide information. Accordingly, the display device 100 may receive an audio signal of re-uttered uttered voice based on the guide information and perform voice recognition so as to enhance a voice recognition rate of user uttered voice.

Figure 11:
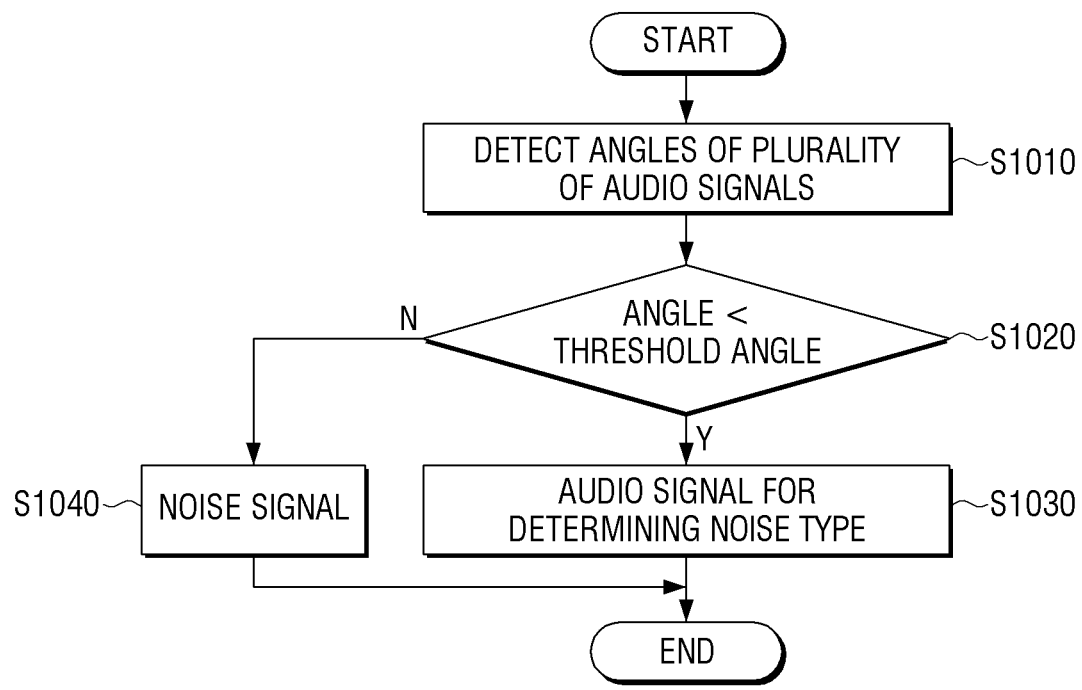
FIG. 11 is a flowchart of a method of determining an audio signal for determining a noise type among a plurality of audio signals by a display device according to an exemplary embodiment of the present disclosure.

FIG. 11 is a flowchart of a method of determining an audio signal for determining a noise type among a plurality of audio signals by a display device 100 according to an exemplary embodiment of the present disclosure.

As illustrated in FIG. 11, upon receiving an audio signal including a voice signal through a plurality of microphones, the display device 100 may detect an angle for each of a plurality of audio signals based on a time difference between a plurality of audio signals input through a plurality of microphones (S1010).

In some exemplary embodiments, the processor 140 may determine a direction of an audio signal input through the plurality of microphones 111 using beamforming technology and detect an angle for each audio signal based on the determined direction.

According the present exemplary embodiment, upon detecting an angle for each audio signal, the display device 100 may compare an angle detected for each audio signal with a preset threshold value (S1020). Then, the display device 100 may determine the detected audio signal with an angle less than a preset threshold value as a signal for determining a noise type and determine the other audio signals as a noise signal via comparison between an angle detected for each audio signal and a preset threshold value (S1030 and S1040).

Then, the display device 100 may compare similarity between a feature value of the detected audio signal with an angle less than a preset threshold value among a plurality of audio signals and a feature value for each noise type included in a pre-stored noise model to determine the type of the noise signal contained in the audio signal and provide guide information corresponding to the determined noise type.

The aforementioned method of recognizing voice by the display device 100 may be embodied using at least one execution program for performing the aforementioned voice recognition and the execution program may be stored in a non-transitory computer readable medium.

The non-transitory computer readable medium is a medium that semi-permanently stores data and from which data is readable by a device, but not a medium that stores data for a short time, such as register, a cache, a memory, and the like. In detail, the aforementioned programs may be stored in various types of recording medium readable by a terminal, such as a random-access memory (RAM), a flash memory, a read-only memory (ROM), an erasable programmable ROM (EPROM), electronically erasable and programmable ROM (EEPROM), a register, a hard disk, a removeable disk, a memory card, a universal serial bus (USB) memory, and a CD-ROM.

Thus far, exemplary embodiments of the present disclosure have been described.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A method of recognizing voice by a display device for performing an operation according to a control command of a remote control device, the method comprising:

receiving, from the remote control device, an audio signal comprising at least one of a voice signal and a noise signal;

transmitting, to the display device, the audio signal received by the remote control device;
extracting a signal characteristic of the received audio signal;
identifying a noise type related to the extracted signal characteristic with reference to signal characteristics for each of a plurality of pre-stored noise types; and
outputting guide information corresponding to the identified noise type,
wherein the identifying the noise type further comprises identifying a noise type that has a characteristic value that is similar to a characteristic value included in the signal characteristic of the audio signal, from among characteristic values included in signal characteristics for each of the plurality of noise types, as the noise type included in the audio signal,
wherein the identifying the noise type further comprises, based on a similarity between feature values of at least two consecutive frames among a plurality of frames included in the audio signal and a feature value of a first noise type among the plurality of noise types being greater than or equal to a preset threshold value, identifying the first noise type as the noise type included in the audio signal and acquiring the guide information corresponding to the first noise type to be output, and
wherein the receiving further comprises selecting an audio signal input of a preset microphone among a plurality of microphones as the audio signal for determining the noise type.

2. The method as claimed in claim 1, wherein the outputting comprises outputting the guide information for guiding remote utterance based on the identified noise type being a type of noise input according to proximity utterance of a user.

3. The method as claimed in claim 1, wherein the outputting comprises outputting the guide information for guiding control of a peripheral device based on the identified noise type being a type of noise into which audio output from the peripheral device is inserted.

4. The method as claimed in claim 1, wherein the outputting comprises outputting the guide information for changing an utterance place based on the identified noise type being a type of noise generated in a surrounding environment.

5. The method as claimed in claim 1, wherein:
the feature values of the plurality of frames and the plurality of noise types are each a Mel-Frequency Cepstral Coefficients value indicating frequency characteristic.

6. The method as claimed in claim 1, wherein:
the display device stores a table obtained by matching signal characteristics for respective noise types and the guide information corresponding to the plurality of noise types; and
the outputting comprises outputting the guide information matched with the identified noise type to at least one of a user interface and an audio device.

7. The method as claimed in claim 1, wherein the identifying comprises:
in response to a plurality of audio signals being received through the plurality of microphones, detecting angles of the plurality of audio signals based on a time difference between the plurality of audio signals and identifying a noise type with respect to the detected signal with an angle less than a preset threshold angle among the detected angles.

8. The method as claimed in claim 7, wherein the identifying comprises identifying a noise type with respect to an audio signal input through the preset microphone among the plurality of microphones.

9. The method as claimed in claim 1, wherein the identifying and the outputting are performed prior to a pre-processing operation of recognizing voice with respect to the voice signal included in the audio signal.

10. A display device for performing an operation according to a control command of a remote control device, the display device comprising:
an inputter configured to receive, from the remote control device, an audio signal comprising at least one of a voice signal and a noise signal;
an outputter configured to output guide information of the received audio signal; and
a processor configured to extract a signal characteristic of the received audio signal, to identify a noise type related to the extracted signal characteristic with reference to signal characteristics for each of a plurality of pre-stored noise types, and to control the outputter to output guide information corresponding to the identified noise type,
wherein the processor is further configured to identify a noise type that has a characteristic value that is similar to a characteristic value included in the signal characteristic of the audio signal, from among characteristic values included in signal characteristics for each of the plurality of noise types, as the noise type included in the audio signal,
wherein the processor is further configured to, based on a similarity between feature values of at least two consecutive frames among a plurality of frames included in the audio signal and a feature value of a first noise type among the plurality of noise types being greater than or equal to a preset threshold value, identify the first noise type as the noise type included in the audio signal and acquire the guide information corresponding to the first noise type to be output, and
wherein the inputter is further configured to select an audio signal input of a preset microphone among a plurality of microphones as the audio signal for determining the noise type.

11. The display device as claimed in claim 10, wherein the processor controls the outputter to output the guide information for guiding remote utterance based on the identified noise type being a type of noise input according to proximity utterance of a user.

12. The display device as claimed in claim 10, wherein the processor controls the outputter to output the guide information for guiding control of a peripheral device based on the identified noise type being a type of noise into which audio output from the peripheral device is inserted.

13. The display device as claimed in claim 10, wherein the processor controls the outputter to output the guide information for changing an utterance place based on the identified noise type being a type of noise generated in a surrounding environment.

14. The display device as claimed in claim 10, wherein:
the feature values of the plurality of frames and the plurality of noise types are each a Mel-Frequency Cepstral Coefficients value indicating frequency characteristic.

15. The display device as claimed in claim 10, further comprising a storage configured to store a table obtained by matching signal characteristics for respective noise types and the guide information corresponding to the plurality of noise types,
- wherein the processor controls the outputter to output the guide information matched with the identified noise type to at least one of a user interface and an audio device.

16. The display device as claimed in claim 10, further comprising the plurality of microphones,
- wherein, in response to a plurality of audio signals being received through the plurality of microphones, the processor detects angles of the plurality of audio signals based on a time difference between the plurality of audio signals and identifies a noise type with respect to the detected signal with an angle less than a preset threshold angle among the detected angles.

17. The display device as claimed in claim 10, further comprising the plurality of microphones,
- wherein the processor determines other signals except for an audio signal input through the preset microphone among the plurality of microphones as a noise signal.

18. The display device as claimed in claim 10, wherein the processor identifies the noise type and controls output of the guide information prior to a pre-processing operation of recognizing voice with respect to the voice signal included in the audio signal.

* * * * *